LOCKING TILT WINDOW SASH AND LOCK THEREFOR

BACKGROUND OF THE INVENTION

In the Art of both residential and commercial window units it is well known to provide tilting window sashes of various constructions. For example, modern single or double-hung windows often include at least one vertically slidable sash which has pivots located at the opposite lateral sides of the sash adjacent to the bottom of the frame stiles and selectively releasable latches located at the opposite lateral sides of the sash adjacent to the top of the respective stiles.

In normal operation, the latches and pivots typically will cooperate with vertical slide channels or tracks in the window jamb to retain the tilting sash for vertical sliding whereby the window is opened and closed. Upon selective release of the upper latches, the sash may be tilted inwardly about the pivots to accommodate cleaning of the exterior glazing surface from within the building.

Various factors including the steadily increasing cost of building maintenance and heightened concern for worker safety have contributed to the demand for such tilting window units. In spite of such demand, however, tilting windows have been subject to certain shortcomings in some instances. For example, modern building codes and architect's specifications, especially for commercial high-rise buildngs, often require the building windows to withstand very large lateral loads without distortion. This has come about in part as a result of increased awareness of the impact a structure like a high-rise office tower can have on such environmental factors as prevailing winds. Indeed, research has clearly demonstrated that the presence of an office tower of given proportions in an air stream can quite readily double the wind velocity of the air passing around the structure, thus resulting in the generation of highly turbulant and forceful air flows and eddies from what would otherwise be merely a gentle breeze. An air flow of such violence can impose loads perpendicular to the exterior glazing surface of up to 50 or 60 pounds per square foot or more on the windows of any building located in the air flow path. In recognition of this phenomenon, window specifications, especially for towers in crowded metropolitan areas, often call for sashes which will withstand 50, 60 or even 100 pounds per square foot of perpendicular force without inward bowing of the window sash stiles or other distortion of the window frame. Any significant inward bowing of the sash stiles would cause loss of seal integrity and result in drafts and water leakage.

Tilt windows in particular have exhibited problems in this regard as the frame of a tilting sash generally cannot be captured by the window jamb along its entire length to be thereby secured against inward bowing without also being incapable of inward tilting. Furthermore, manually operated latches intermediate the ends of the tilting sash stiles, although offering the prospect for sufficient anti-bowing support to satisfy applicable load bearing criteria, have often been objectionable to architects who seek windows with a clean interior finish.

BRIEF SUMMARY OF THE INVENTION

The present invention contemplates a tilting window sash which incorporates in each of its stiles a spring loaded locking pin or latch which is operable to permit the sash to be raised vertically for opening to provide fresh air ventilation, or to be tilted inwardly for cleaning. The locking pin operates automatically in response to sash raising or tilting to permit these functions without need of any separate manipulation of the lock. Additionally, the lock is automatically effective as a positive anti-bowing restraint when the sash is closed. Accordingly, the locking pins are carried by the window sash stiles for cooperation with the window jamb to provide anti-bowing support at points preferably about midway between the ends of the respective stiles.

More particularly, the invention contemplates a spring loaded, generally rectangular elongated locking pin having a generally pyramidal jamb engagement portion which cooperates with a cutout formed in the jamb to provide the above described functions. The locking pin is retained with a recess in the stile which may be a channel section of an elongated extrusion, by a clip which defines a housing for the locking pin.

Accordingly, one object of this invention is to provide a novel and improved tilting and vertically slidable window sash which includes an anti-bowing lock to automatically engage the window jamb in a manner to support the sash against inward bowing loads when the sash is closed.

Another object of the invention is to provide a novel and improved locking mechanism which automatically affords anti-bowing support for the stiles of a tilting, vertically slidable window sash while also automatically accommodating the tilting and vertical sliding of the sash.

These and other objects and advantages of the invention will be more fully understood upon consideration of the following detailed description and the accompanying drawings in which:

FIG. 1 is a perspective view of a tilting window sash according to the present invention;

FIG. 2 is a sectional view taken on line II—II of FIG. 1 and showing the locking mechanism of the invention;

FIG. 3 is a fragmentary section taken on line III—III of FIG. 2;

FIG. 4 is a fragmentary elevation taken on lines IV—IV of FIG. 3; and

FIG. 5 is a perspective view of the locking pin element of the invention.

There is generally indicated at 10 in FIG. 1 a single hung window unit according to one presently preferred embodiment of the instant invention and shown as including a fixed sash 12 and a vertically slidable tilting sash 14 which incorporates anti-bow locks 16 in each of the vertical stiles 17 of the sash frame 19. Although a single hung window is shown, it will be appreciated that the invention is applicable in any window having a vertically slidable and tiltable sash, whether of a single or double hung configuration, or of other suitable design. Furthermore, it will be appreciated that in theory the invention is applicable not only to a window unit having a frame constructed of aluminum extrusions as shown, but additionally to windows with wood, vinyl or other suitable frame structures.

As shown, sash 14 includes selectively operable top latches 18 which may be actuated from the interior side of sash 14 to release the sash for inward tilting thereof about pivots 20 located adjacent the lower ends of sash 14 on pivot axis X—X. As shown at 22, sash 14 typically is initially raised vertically by a desired amount to per- U.S. Patent   Nov. 25, 1986   Sheet 1 of 6   4,624,074

SLIDING DOOR ASSEMBLY

FIELD OF INVENTION

This invention relates to a sliding door assembly, more particularly but not exclusively a sliding door assembly for a vehicle body, which has at least one slidable door arranged to be swung out of a first closed position into a second position, the door being swingable out of a first, general plane occupied in the closed position to occupy whilst in the second position a second, general plane substantially parallel to the first plane; the slidable door being adapted to be slid past a wall or other door of the assembly which is aligned with the first plane (hereinafter referred to as a door assembly "of the type specified").

BACKGROUND OF INVENTION

Door assemblies of the type specified have been previously proposed which enable a sliding door to be swung outwardly and downwardly and so that rollers at the top of the swingable door also move outwardly by way of guide means (on a support slide rail for the rollers) co-operable with cam means on the door. The swingable door may be raised and lowered, whilst the cam means rides on the guide means, by a lever operated mechanism mounted on the swingable door and/or on a part of the assembly adjacent the swingable door. The lever operated mechanism usually involves part of the assembly adjacent the bottom of the swingable door acting as a support for part of the mechanism whilst the swingable door is moved from the closed position to the second position and vice versa.

Such assemblies are designed for vehicles because the maximum outer dimensions and therefore the width of the vehicle are regulated by law and yet there is a need to have full access to the interior of the vehicle through one or more side walls of the vehicle for unloading or loading. It is often unnecessary to open the whole side at once and it is sufficient if this can be done in stages.

Various problems exist in the design of sliding door assemblies of the type specified and the reliability of a particular design has to be weighed against the convenience and cost of manufacture as well as the ease of operation and simplicity of the system. Particular problems exist in the design of the rails of the assembly along which the swingable door can slide as well as in the operating mechanism and means employed to swing the swingable door out of the closed position.

SUMMARY OF INVENTION

It is an object of the present invention to provide a sliding door assembly of the type specified in which some of the design problems in connection therewith are alleviated and therefore to provide a sliding door assembly having some improved characteristics.

According to one aspect of the present invention there is provided a sliding door assembly of the type specified in which the at least one swingable door carries slider means, for example rollers, which slider means is co-operable with a slide rail to allow said door to be slid along the slide rail in use, said slider means being arranged to pivot about the slide rail relative to said door when said door is swung from the first position relative to the second position.

Further according to the present invention there is provided a vehicle body or vehicle including at least one sliding door assembly as described in the immediately preceeding paragraph.

Preferably, the slider means pivots on a fixed axis about the slide rail.

Preferably, the slide rail defines a groove along which the slider means is entrained to move, said groove being appropriately dimensioned to allow the slider means to pivot whilst still in the groove. In order to provide this facility an inner edge of the groove is conveniently curved and may be defined by the curved edge of a projection of convex section. The slide rail may be provided with spring means to check the swinging movement of the door and to bias the door into correct location in the groove during sliding. Means (for example an elongate slot) on the slide rail may be provided to engage the slider means when the door is in the closed position to help maintain the slide means in its correct location.

In one embodiment, the slide rail comprises three main sections welded together with a first one of said sections embracing the second and third sections, the second section defining the groove in which the slider means is located and the third section being located underneath said second section and supporting second slider means of a second, slidable but non-swingable door of the assembly. The second door is preferably arranged in a plane spaced outwardly from the second slider means.

The first slider means may rest at an angle of 45° to the horizontal when the swingable door is in the closed position.

Where rollers are provided they may be arranged to be pivotable about an axis, or said axis, at or towards the bottom of the rollers. Preferably, the rollers (or other slider means) are connected to a carriage which pivots with the rollers (slider means) and said carriage is pivotally connected to at least one operating rod, said at least one operating rod being generally vertically reciprocable in use to pivot the carriage and rollers (or other slider means). Preferably, the operating rods are within the swingable door.

In one embodiment the first slider means and carriage is also a bell crank mechanism.

Where operating rods are provided as aforesaid, the door assembly may include a hand-operated lever pivotally mounted on the door and pviotally connected to the operating rods via a link mechanism.

The lever may be pivotally connected on the swingable door and be arranged to pivot the first slider means about the slide rail without co-operating with other support means adjacent the swingable door such as support means on the lower rail. In this way the mechanism for pivoting the first slider means is advantageously self-contained within the swingable door.

The hand operated lever may be connected to a locking mechanism which automatically locks the swingable door in its closed position as the lever is moved to swing the door to the closed position. The locking mechanism may comprise one or more catches on a pivot pin about which the lever is pivotable and these catches may snap-engage with a striker bar on a lower slide rail.

Alternatively catches could be provided on the lower slide rail and a bar on the swingable door being co-operable therewith.

According to another aspect of the present invention there is provided a sliding door assembly of the type specified comprising a pivotable lever connected by a link mechanism to at least one operating rod, said at least one operating rod being co-operable with means on the at least one door to swing said door from the closed position into said second position, the link mechanism and said at least one rod being contained within the door and arranged so that said mechanism does not contact, co-operate with, or use for support a lower frame portion or rail adjacent the door during movement of the door from the closed position to the second position or vice versa.

Further according to the present invention there is provided a vehicle body or vehicle including at least one sliding door assembly as described in the immediately preceding paragraph.

By the second aspect according to the present invention there is provided an assembly in which the means for swinging the door into or out of the closed position may be substantially wholly contained within the door. The link mechanism may be of simple form since it does not co-operate with a supporting part of the assembly.

The lever may be pivotally mounted on a support plate fixed on the outer side of the door, the plate having a recess into which the lever fits. The recess of the plate is, preferably, housed within the door and the operating rod or rods may be connected to a long pivot pin which passes through slots in opposed walls of the recess, said pin being constrained to move along the slots and being pivotally connected by way of a link to the operating lever.

Some proposed sliding door assemblies of the type specified tend to be disadvantageous because the swingable door carries exposed parts of a lever-operated door release mechanism; these parts co-operate with a lower slide rail of the assembly as the door is swung between the closed and second position. This sort of mechanism may be more complicated than it needs to be because of the need to have parts which co-operate with a lower rail of the assembly. Thus, these proposed mechanisms may be more complicated than need be; parts of the mechanism may possibly be subjected to greater wear than necessary and because of exposure are more subject to damage and extraneous environmental effects.

The operating rod or rods co-operate with means as aforesaid which is preferably located at or towards the top of the door and this means may be a carriage to which the slider means is attached. The carriage and slider means may both be pivotable by the operating rod or rods. The slider means may comprise rollers.

The door may be automatically locked in the closed position by a locking mechanism as the lever is moved to move the door into the closed position. The locking mechanism may comprise one or more catches mounted on the pivotal axis of the lever which can co-operate with locking bars on the lower frame portion or rail.

The sliding door assembly may include the safety feature that the pivotable lever becomes operatively disconnected, for example by disengagement with its pivot pin, when the door has been swung to the second position.

According to a further aspect of the present invention there is provided in a sliding door assembly of the type specified a pivotable lever connected by a link mechanism to at least one operating rod cooperable with means on the at least one door to swing said door from the closed position into said second position, the pivotable lever being arranged such that, in use, it becomes operatively disconnected when the door has been swung to the second position.

The link mechanism and said at least one rod will usually be contained within the door, and, preferably, the pivotable lever becomes operatively disconnected by disengagement with an associated pivot pin.

The lever may be provided at one end thereof with a curved edge which engages said pivot pin and remains in engagement therewith while the lever is pivoted in a first direction of rotation to swing said door from the first position to the second position but then becomes operatively disconnected therefrom on further rotation of the lever in the first direction whilst still being connected to the link mechanism by way of a link. The lever may then hang freely but may be operatively reconnected by rotating the lever in a second direction of rotation opposite to said first direction of rotation. Conveniently the lever must be rotated through a substantial angle (preferably in excess of 90°) in order to reconnect the lever on its pivot pin.

In one embodiment the pivotable lever is a handle which is, advantageously, arranged within, and without protruding from, a recess in a support plate mounted on said at least one door.

The operative disconnection of the pivotable lever provides a safety feature since it has to be positively operatively re-engaged with the mechanism before it can operate to swing said door back to the first closed position.

With previous designs it is possible for the pivotable lever to be inadvertently knocked or moved accidentally due to its general disposition in relation to said door once said door is in the second position. This could lead to a fouling of the mechanism or possibly, for example, to entrapment of a person's fingers if said door should be swung towards a closed position whilst being incorrectly aligned (i.e. overlapping a wall or other door of the sliding door assembly). The pivotable lever of the present invention, when operatively disconnected, preferably, hangs vertically downwardly generally parallel to the door to which it is attached and, therefore, does not represent the sort of hazard provided by other levers (which project at an angle outwardly from the door a considerable distance) when the door is in said second position. A lever projecting at an angle from the door could injure a person should that person walk into it and could in any event cause a certain measure of inconvenience by its presence.

According to yet a further aspect of the present invention there is provided a lever mechanism comprising a support plate or support member having a recess housing a hand-operable pivotable lever, the lever being connected to one end of a link by a first pivot pin and the other end of the link being connected to a second pivot pin which passes through a slot in a wall of the recess, said second pin being constrained to move along the slot upon rotation of the pivotable lever about an axis provided by a third pivot pin, a connecting member being mounted between the first pivot pin and third pivot pin, the arrangement being such that the lever may be rotated in a first direction from a first position within the recess about said axis until said second pin reaches the bottom of said slot, during which rotation the connecting member rotates about said axis, whereupon further rotation of the handle in said first direction results in the handle being operatively disconnected from the remainder of the lever mechanism by the lever being disconnected from said axis.

BRIEF DESCRIPTION OF THE DRAWINGS

An embodiment of a sliding door assembly in accordance with the present invention will now be described, by way of example only, with reference to the accompanying simplified drawings in which.

DESCRIPTION OF PREFERRED EMBODIMENT

Figures 1, 2, 5:
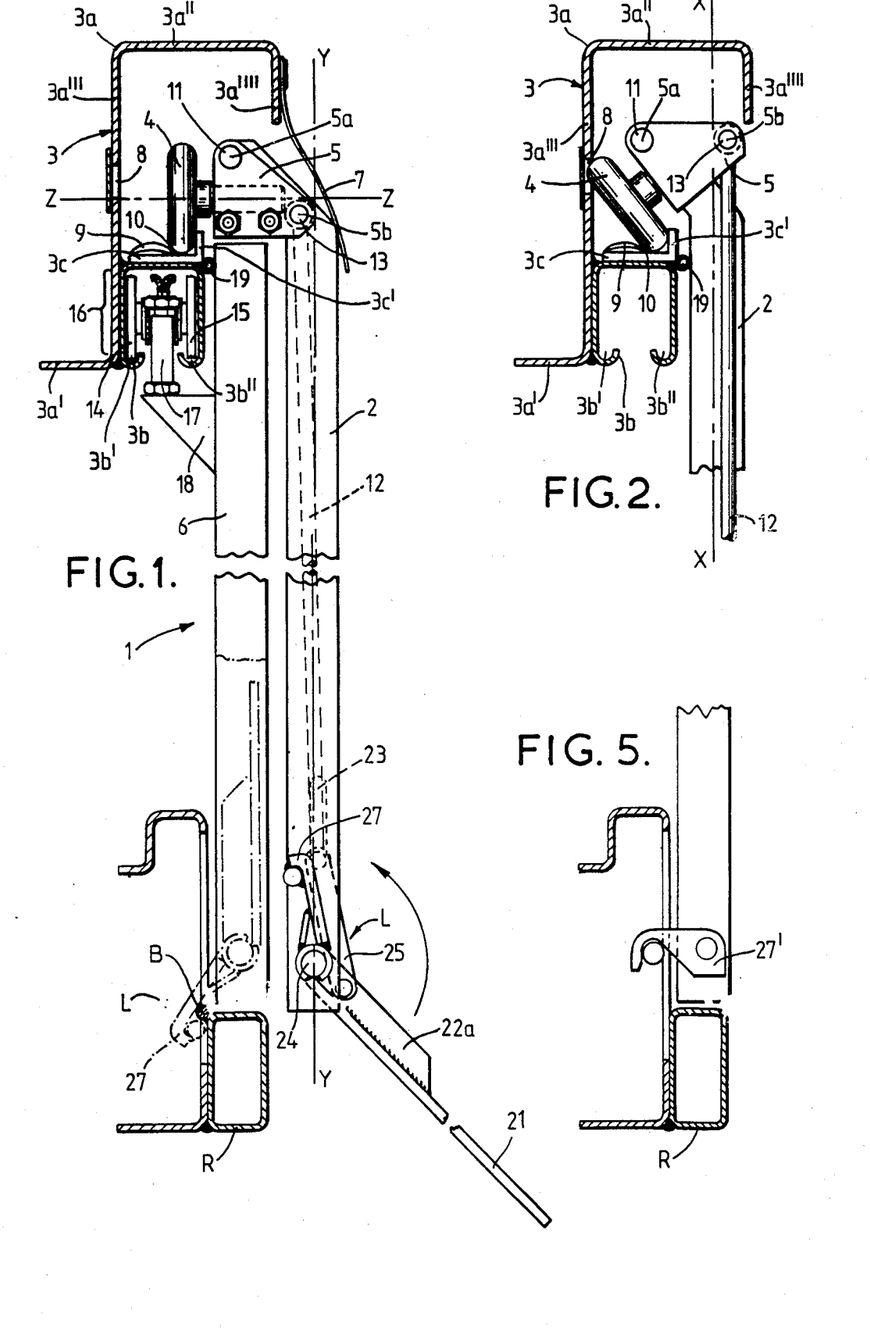
FIG. 1 shows a sectional side view of the sliding door assembly with a slidable door swung out of a closed position.
FIG. 2 shows a detail of the upper portion of FIG. 1 with the slidable door in the closed position.
FIG. 5 shows a modified locking arrangement of the door assembly.
Figure 10:
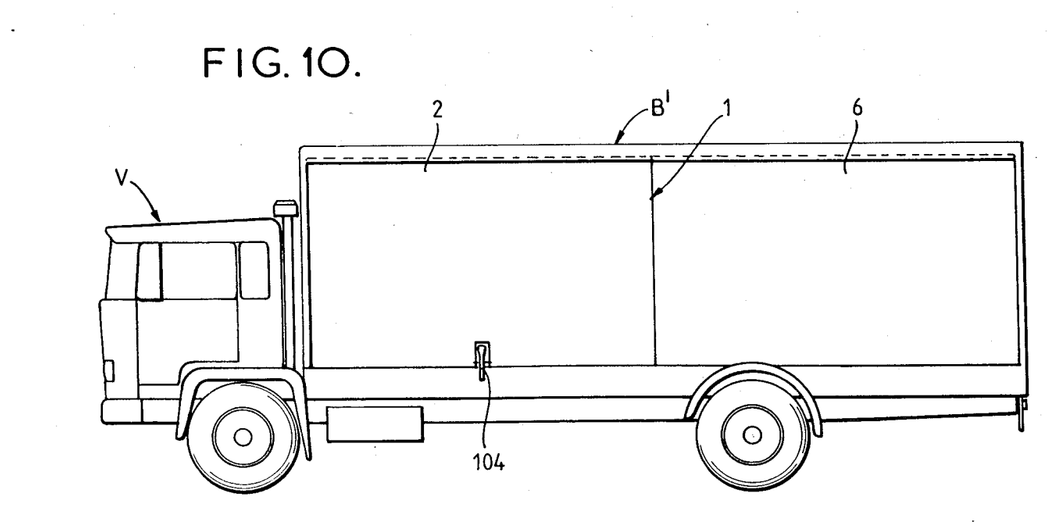
FIG. 10 shows schematically a view of a vehicle with the sliding door assembly.

FIG. 1 shows a sectional view through a sliding door assembly 1 for a vehicle body B' of a vehicle v (see FIG. 10). Sliding door assemblies for vehicle bodies are well known and may include one or more sliding and swingable doors mounted on an open side of the vehicle body.

The upper portion of FIG. 1 shows how a slidable door 2 is hung from an upper slide rail 3 of the assembly. As shown in the upper portion of FIG. 1, the door 2 has been swung from the first, closed position (see FIG. 2) in which it occupied a general plane X—X to a second position in which it occupies a second, general plane Y—Y substantially parallel to plane X—X.

The door 2 carries pivotable slider means in the form of rollers 4 (only one shown) mounted on a carriage 5 of generally triangular cross section. The door 2 is slidable in the plane Y—Y in a direction whcih is into or out of the plane of the paper.

The door assembly 1 is of the kind specified and a second door 6 is aligned with, and arranged to slide in, the general plane X—X whilst the first floor 1 is in the second position in plane Y—Y as shown in FIG. 1.

The slide rail 3 generally comprises three uniform sections 3a, 3b, 3c which are welded together. Rail section 3a comprises two spaced, horizontal limbs 3a', 3a'' and two spaced, vertical limbs 3'''a, 3a''''. The rail section 3a generally embraces rail sections 3b, 3c and spring means in the form of a rubber pelmet 7 running parallel with the rail 3 is attached at an upper end thereof to limb 3a''''; the other end of the pelmet 7 engages the upper end of door 2 and protects the rail 3, rollers 4 and carriage 5 from environmental effects, for example from dust, leaves and rain.

The pelmet 7 may be spring loaded to check the postion of the pelmet whilst the swinging door 2 is closed and whilst the vehicle is in motion.

Vertical limb 3a''' is provided with an elongate slot 8 running parallel with the rail 3 which receives part of the circumference of each roller 4 (see FIG. 2) when the door 2 is in the closed position; the slot constitutes means to help to maintain the door in the closed position and may alleviate rattling of the rollers 4 when the vehicle is in motion. As shown in FIG. 2 the rollers 4 rest at an angle of about 45° to the horizontal when the door 2 is in the closed position.

The left-hand side of rail section 3b is welded to limb 3a''' as shown in FIGS. 1 and 2 and rail section 3c is welded to the top of section 3b. Rail section 3c is generally L-shaped and has an inner projection 9 of convex cross section which together with flange 3c' define a groove 10 along which rollers 4 can run. The convex section of projection 9 allows each roller 4 to pivot, when required, in the groove 10 about the rail and about a fixed axis located at or towards the bottom of the rollers and yet entrain the rollers to roll along the groove during sliding motion of the door 2 and carriage 5.

The roller 4 as shown is also mounted to rotate about its own axis Z—Z; axis Z—Z is fixed relative to the carriage 5. The motion of carriage 5 and rollers 4 while the door 1 is swung outwardly from the closed position shown in FIG. 2 to the position shown in FIG. 1 or while the door is moved from the second position to the closed position should be self evident from the drawings; the carriage is pivotable about axes 5a and 5b relative to the door 2 during such movement. The carriage 5 with rollers 4 forms a bell crank mechanism and is connected to the door 2 via upper pivot pin 11 providing axis 5a and to a pair of parallel operating rods 12 (only one shown) via pivot pin 13 providing axis 5b. The operating rods 12 are moved generally upwardly or generally downwardly to cause the rollers 4 to pivot and a lever mechanism used to operate the rods 12 will be described in detail later in the specification. The operating rods 12 are disposed one behind the other at right angles to the general plane of the paper in FIG. 1 and are located out of sight within the sliding door 2.

Rail section 3b is generally of inverted U-shape and defines lower troughs 3b' and 3b'' for the reception of rollers 14, 15 of a roller assembly 16. The roller assembly 16 is connected via shaft 17 to the top wall of angle piece 18. The right hand side wall of angle piece 18 is connected to door 6 so that door 6 is aligned with the general plane X—X at all times and displaced outwardly from the rail section 3b. 19 is a seal of O-ring section located between door 6 and rail section 3b.

The lower part of FIG. 1 shows the general operating mechanism responsible for operating rods 12 in unison to pivot rollers 4, and also a locking mechanism L for locking the door 1 in the closed position simultaneously as the door is moved into the closed position. As a clarification, part of the door 6 is also shown repeated in the closed position and the locking mechanism L in this position is shown in chain-dotted lines. The locking mechanism L is discussed later on in the specification.

Figure 3:
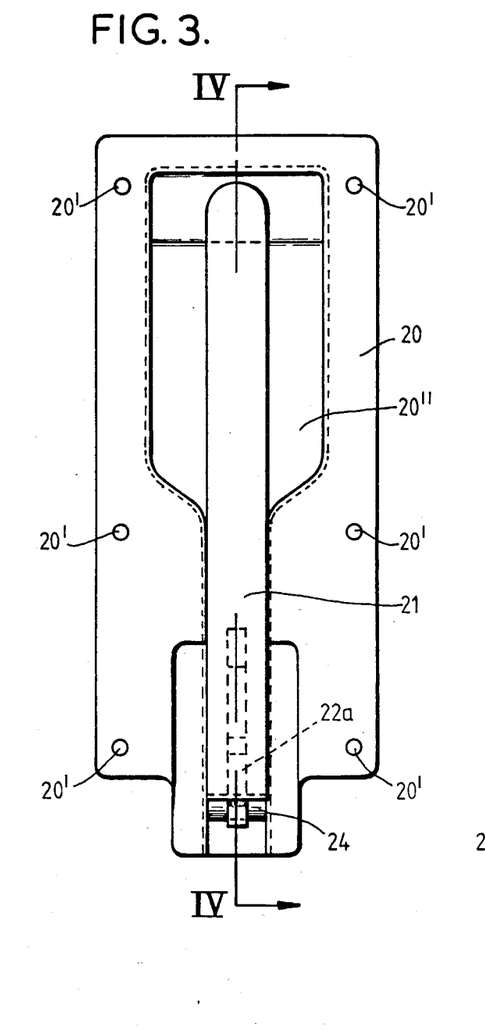
FIG. 3 shows a front view of a lever mechanism of the assembly.
Figure 4:
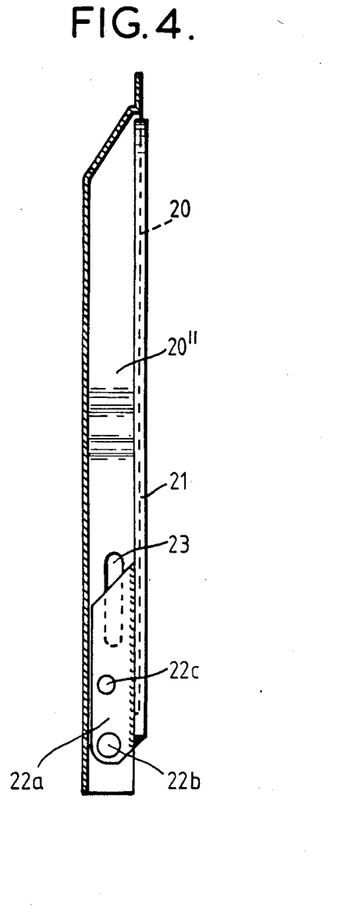
FIG. 4 shows a part sectional side view of the lever mechanism taken on line IV—IV of FIG. 3.

Referring to FIGS. 3 and 4, the lever mechanism has a support plate 20 fixed by means of fixing holes 20' onto the outward face of door 2 and towards the bottom thereof. The support plate 20 has a recess 20'' extending almost the entire length of the plate which fits inside a hollow in the door 2. A hand-operated lever 21 is arranged to lie within the recess 20'' and the upper portion of this lever may be gripped by hand by access into the wider upper portion of recess 20''. This upper portion of recess 20'' tapers smoothly inwardly from about half way down the plate 20 as shown in FIG. 4 and narrows to the width of lever 21. Two slots 23 (only one shown in FIG. 5) are arranged opposing one another on either side of the lever 21 in respective side walls of the recessed portion 20". A lower attachment portion 22a of the lever 21 extends into the recess 20" and as shown in FIG. 5 overlaps the slots 23. The attachment portion 22a is pivotally mounted via hole 22b and a pivot pin 24 which is mounted in the side walls of recess 20". The attachment portion 22a further comprises a hole 22c which receives a pivot pin (not shown) connected to one end of a link 25 (see FIG. 1). The link 25 comprises two spaced opposing parts which lie on either side the attachment portion 22a of lever 21. A long pivot pin (not shown) passes through the upper end of link 25 and into each of the slots 23 (see FIG. 1); this pivot pin extends all the way through the side walls of the recess 20" and the operating rods 12 are mounted at either end of the long pivot pin. The long pivot pin is thus constrained to a reciprocal movement along, and limited by the length of, the slots 23.

With the lever 21 in the position shown in FIG. 4 door 2 is in the closed position aligned in plane X—X (see FIG. 2). To operate the release mechanism to swing the door 2 outwardly and pivot rollers 4 to the position shown in FIG. 1, lever 21 is gripped and rotated downwards about pivot pin 24 to the position shown in FIG. 1. The link 25 moves with the lever attachment portion 22a which moves said long pivot pin along slots 23 and thereby causes the operating rods 12 at either end of said pin to move downwardly thereby pivoting the bell crank comprised by carriage 5 and rollers 4. The reverse lever action brings the door 2 back to its closed position.

In alternative embodiment (not illustrated) recess 20" has a plate spring 26 riveted to the back wall thereof to provide a resilient seating for the lever 21 so that it is biassed to the correct position ready for use. Such a spring is not required in the present embodiment.

Additionally the lever 21 is connected to the locking mechanism L (shown in both the open and closed positions in FIG. 1). The locking mechanism L is welded to the pivot pin 24 and in the closed position hook shaped catches 27 (located on each end of the pivot pin 24) engage a striker bar B on the lower slide rail R. The catches 27 pivot with the pin 24 and the door 2 is automatically unlocked from rail R on downward operation of the lever 21 by disengaging catches 27 from the bar B and thereby allowing door 2 to swing outwardly. Upward rotation of the lever 21 moves the door 2 back to the closed position and the catches 27 automatically snap-engage with the bar B to lock door 2 in position.

Seals (not shown) which may be reinforced on the leading and trailing edges of the door 2 hold the door 2 into the surrounding frame when the doors are locked. Additional locking devices may be incorporated into either or both types of door (swingable and non-swingable) if required for security or safety reasons.

The catches 27 could alternatively be of the form 27' shown in FIG. 5.

Figure 6:
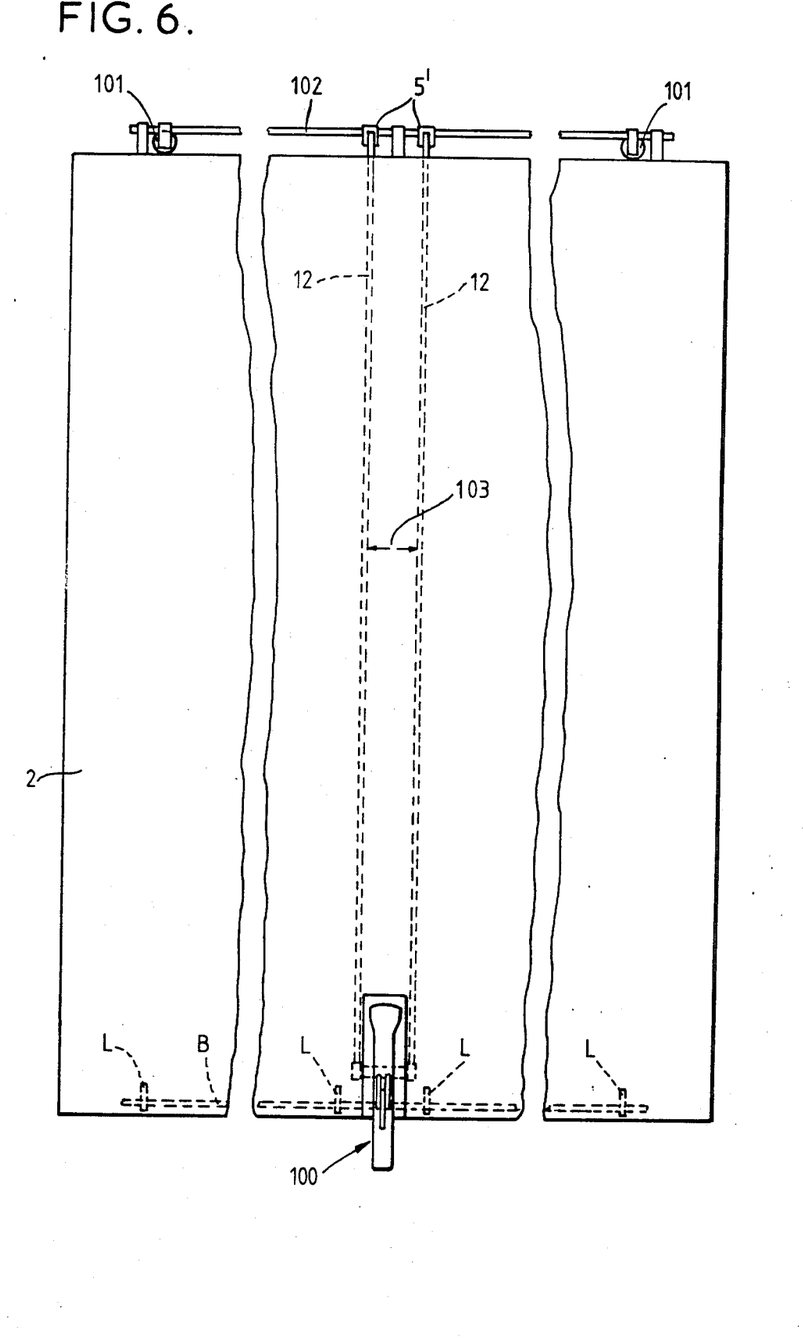
FIG. 6 shows a much simplified schematic front view of the sliding door assembly in which the lever mechanism has been modified.

FIG. 6 shows a schematic front view of the sliding door with a modified hand-operated lever mechanism 100. Also, the mounting of the slider means in the form of rollers 101 at the ends of the pivot pin 102 which passes through triangular carriage members 5' represents a modification of the embodiment shown in FIGS. 1 and 2. The spacing 103 of the operating rods may be chosen to suit and the rods 12 could in fact be arranged near the vertical sides of the door 2 if preferred.

Figure 7:
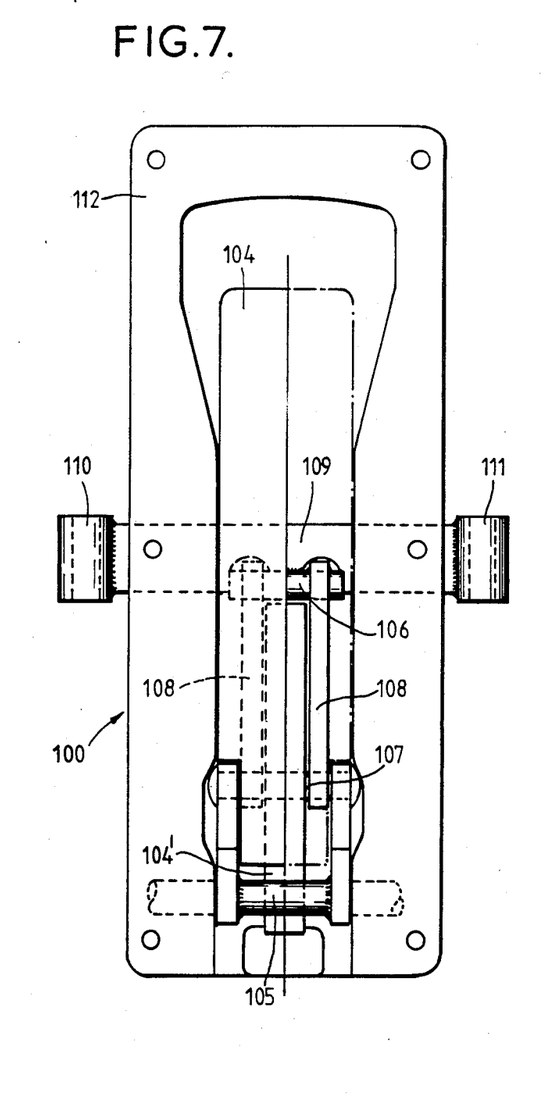
FIG. 7 shows a part-sectional front view of the modified lever mechanism.
Figure 8:
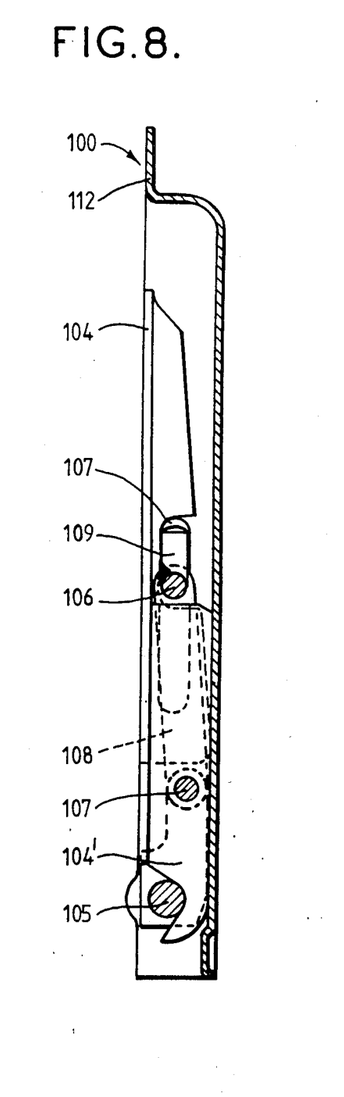
FIG. 8 shows a sectional side view of the modified lever mechanism in a closed position.
Figure 9:
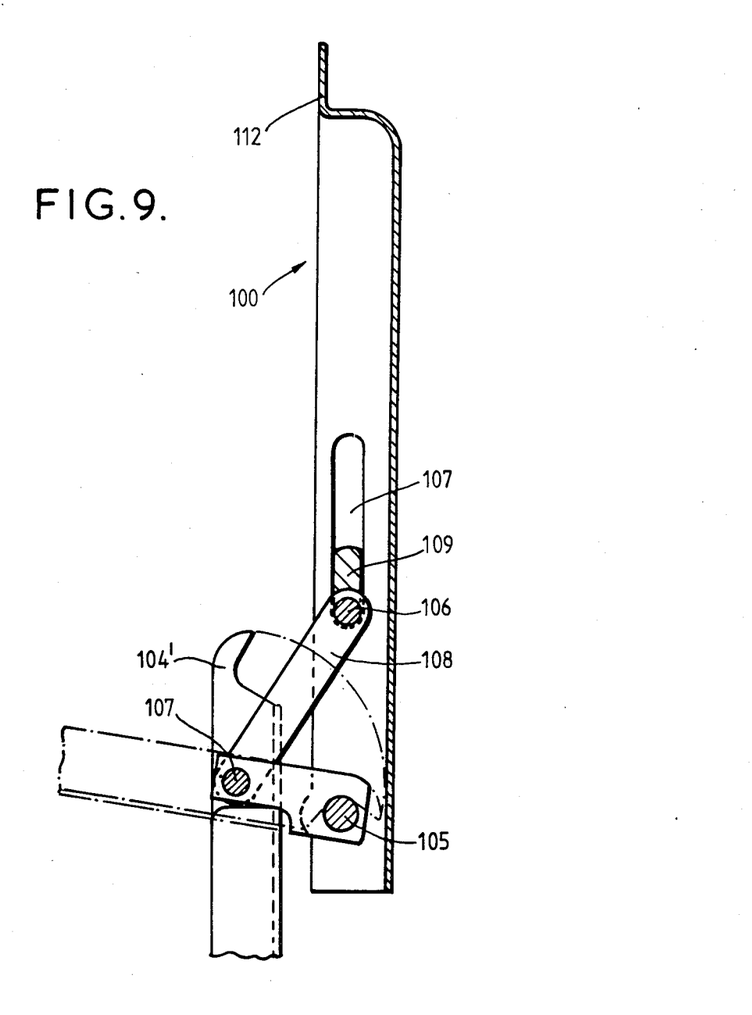
FIG. 9 shows a sectional side view of the modified lever mechanism in an open position.

FIG. 7 shows a part sectional detail view of the modified hand-operated lever mechanism 100 and FIGS. 8 and 9 show sectional side views of the mechanism 100 in closed and open positions respectively. The mechanism 100 is generally similar to that previously described although there are some important advantages of mechanism 100.

Firstly, the handle 104 does not protrude from the recess 105 provided in the support plate 112 as in the aforedescribed lever mechanism and so provides a more compact and neater design.

Also, most importantly, the modified lever mechanism 100 has an added safety feature. With the mechanism shown in FIGS. 3 and 4 the handle 20 remains in operative contact with the operating rods 12 at all times i.e. when the door 2 is in the closed position and also after the door 2 has been swung to the open (second) position. It is a safety feature of mechanism 100 that the handle 104 becomes operatively disconnected when the swinging door 2 has been swung to its open position so that the handle no longer acts on the operating rods.

Instead of the handle 104 being fixed to pivot about a pivot pin (for example pivot pin 24 in FIG. 3) it is provided with a curved end 104' (reminiscent of part of an open spanner) which engages pivot pin 105 and remains in engagement therewith through the necessary angle of rotation of handle 104 to bring the sliding door 2 from the closed to the open position. Once this necessary angle of rotation has been exceeded and pivot pin 106 has reached the bottom of slot 107 further movement of the handle 104 in the same rotational direction lifts the end 104' off pivot pin 105 so that the handle is operatively disconnected from the remainder of the mechanism and can drop under its own weight, the handle 104 being retained to the remainder of the mechanism by way of pin 107 to link 108. FIG. 9 shows the final position of handle 104 when the door 2 is in the open position and also the position of the handle 104 (in chain dotted lines) just before end 104' becomes disconnected from the pivot pin 105. The handle 104 is simply operatively re-connected to the remainder of the mechanism by rotating the handle in the opposite sense thereby automatically re-engaging end 104' on pivot pin 105.

Also, as shown in FIGS. 7 to 9 pivot pin 106 is attached to a bar 109 of generally flat section having receiving sleeves 110''', at either end for the reception of the operating rods 12. The bar 109 is also constrained to move along slot 107.

Since the remainder of the parts of the locking mechanism 100 operate similarly to the embodiment shown in FIGS. 3 and 4, the operation of locking mechanism 100 is not further described.

FIG. 10 shows the vehicle v with the sliding door assembly having the modified lever mechanism shown in FIGS. 7 to 9, and with the lever 104 operatively disconnected and hanging freely.

In an alternative embodiment no lever mechanism or operating rods 12 need be provided. The door 2 could simply be lifted by hand into and out of the closed position (finger holes could be provided at the bottom of the door for this purpose). Appropriate locking catches could be provided to lock the door 2 in the closed position.

It is to be appreciated that the sliding door assembly substantially as described herein offers many advantageous features and selected individual features (for example the lever operated mechanism itself), may be patentably inventive. The present invention is not limited by the choice of particular terminology and the applicant reserves the right to replace any specific term herein with an appropriate generic term.

Furthermore, the present invention is, of course, in no way restricted to the specific disclosure of the specification and drawings, but also encompasses any modifications within the scope of the appended claims.

I claim:

1. A sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and in which said at least one swingable door carries slider means, for example rollers, and said slider means is cooperable with a slide rail to allow said door to be slid along said slide rail in use, said slider means being arranged to pivot about said slide rail relative to said door when said door is swung from said first position relative to said second position; the slide rail defining a groove along which the slider means is entrained to move, said groove being appropriately dimensioned to allow the slider means to pivot whilst still in the groove, the inner edge of the groove being curved, the curved inner edge of the groove being defined by the curved edge of a projection of convex section.

2. A sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and in which said at least one swingable door carries slider means, for example rollers, and said slider means is cooperable with a slide rail to allow said door to be slid along said slide rail in use, said slider means being arranged to pivot about said slide rail relative to said door when said door is swung from said first position relative to said second position; the slider means being connected to a carriage which pivots with this slider means and said carriage being pivotally connected to at least one operating rod, said at least one operating rod being generally vertically reciprocable in use to pivot the carriage and the slider means, the or each operating rod being within the swingable door, the slider means and carriage also being a bell crank mechanism.

3. An assembly as claimed in claim 2 in which the door assembly includes a hand-operated lever pivotally mounted on the door and pivotally connected to the or each operating rod via a link mechanism and in which the lever is pivotally connected on the swingable door and arranged to pivot the first slider means about the slide rail without cooperating with other support means adjacent the swingable door and in which the hand operated lever is connected to a locking mechanism which automatically locks the swingable door in its closed position as the lever is moved to swing the door to the closed position.

4. An assembly as claimed in claim 3 in which the locking mechanism comprises one or more catches on a pivot pin about which the lever is pivotable.

5. An assembly as claimed in claim 4 in which the catches snap-engage with a striker bar on a lower slide rail.

6. An assembly as claimed in claim 4 in which the catches are on a lower slide rail and a bar on the swingable door is cooperable therewith.

7. A sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and having a pivotable lever connected by a link mechanism to at least one operating rod, said at least one operating rod being cooperable with means on the at least one door to swing said door from the closed position into said second position, said link mechanism and said at least one rod being contained within the door and arranged so that said mechanism does not contact, cooperate with, or use for support a lower frame portion or rail adjacent the door during movement of the door from the closed position to the second position or vice versa.

8. An assembly as claimed in claim 7 in which the lever is pivotally mounted on a support plate fixed on the outer side of the door, the plate having a recess into which the lever fits.

9. An assembly as claimed in claim 8 in which the recess of the plate is housed within the door and the operating rod or rods are connected to a long pivot pin which passes through slots in opposed walls of the recess, said pin being constrained to move along the slots and being pivotally connected by way of a link to the operating lever.

10. An assembly as claimed in claim 7 in which said means on the at least one door is located at or towards the top of the door, and in which said means is a carriage to which the slider means is attached and in which the carriage and slider means are pivotable by the operating rod or rods and in which the slider means comprise rollers.

11. An assembly as claimed in claim 7 in which the door is automatically locked in the closed position by a locking mechanism as the lever is moved to move the door into the closed position.

12. An assembly as claimed in claim 11 in which the locking mechanism comprises one or more catches mounted on the pivotal axis of the lever which can cooperate with locking bars on the lower frame portion or rail.

13. An assembly as claimed in claim 7 which includes the safety feature that the pivotable lever becomes operatively disconnected, for example by disengagement with its pivot pin, when the door has been swung to the second position.

14. A sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and in which said at least one swingable door carries slider means, for example rollers, and said slider means is cooperable with a slide rail to allow said door to be slid along said slide rail in use, said slider means being arranged to pivot about said slide rail relative to said door when said door is swung from said first position relative to said second position, and in which said slider means is connected to a carriage which pivots with this slider means and said carriage is pivotally connected to at least one operating rod, said at least one operating rod being generally vertically reciprocable in use to pivot said carriage and the slider means.

15. An assembly as claimed in claim 14 in which the slider means pivots on a fixed axis about the slide rail.

16. An assembly as claimed in claim 14 in which the slide rail defines a groove along which the slider means is entrained to move, said groove being appropriately dimensioned to allow the slider means to pivot whilst still in the groove, and in which the width of the bottom of the groove conforms to width of the slider means.

17. An assembly as claimed in claim 14 in which means on the slide rail is provided to engage the slider means when the door is in the closed position to help maintain the slider means in its correct location.

18. An assembly as claimed in claim 14 in which the slide rail comprises three main sections welded together with a first one of said sections embracing the second and third sections, the second section defining a groove in which the slider means is located and the third section being located underneath said second section and supporting second slider means of a second, slidable but non-swingable door of the assembly and in which the second door is arranged in a plane spaced outwardly from the second slider means.

19. An assembly as claimed in claim 14 in which the slider means rests at an angle of 45° to the horizontal when the swingable door is in the closed position.

20. An assembly as claimed in claim 14 in which the slider means comprises rollers and the rollers are arranged to be pivotable about an axis at or towards the bottom of the rollers.

21. An assembly as claimed in claim 14 in which the or each operating rod is within the swingable door, and in which the slider means and carriage is also a bell crank mechanism.

22. An assembly as claimed in claim 21 in which the door assembly includes a hand-operated lever pivotally mounted on the door and pivotally connected to the or each operating rod via a link mechanism and in which the lever is pivotally connected on the swingable door and arranged to pivot the first slider means about the slide rail without cooperating with other support means adjacent the swingable door and in which the hand-operated lever is connected to a locking mechanism which automatically locks the swingable door in its closed position as the lever is moved to swing the door to the closed position.

23. An assembly as claimed in claim 22 in which the locking mechanism comprises one or more catches on a pivot pin about which the lever is pivotable.

24. An assembly as claimed in claim 23 in which the catches snap-engage with a striker bar on a lower slide rail.

25. An assembly as claimed in claim 23 in which the catches are on a lower slide rail and a bar on the swingable door is cooperable therewith.

26. A vehicle body having a sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and in which said at least one swingable door carries slider means, for example rollers, and said slider means is cooperable with a slide rail to allow said door to be slid along said slide rail in use, said slider means being arranged to pivot about said slide rail relative to said door when said door is swung from said first position relative to said second position, and in which said slider means is connected to a carriage which pivots with this slider means and said carriage is pivotally connected to at least one operating rod being generally vertically reciprocable in use to pivot said carriage and the slider means.

27. A sliding door assembly having at least one slidable door having means to be swung out of a first, closed position into a second position, said at least one slidable door being swingable out of a first, general plane occupied in said closed position to occupy whilst in said second position a second, general plane substantially parallel to said first, general plane; said slidable door having means to be slid past a wall or other door of said assembly which is aligned with said first, general plane and having a pivotable lever connected by a link mechanism to at least one operating rod co-operable with means on the at least one door to swing said door from the closed position into said second position, the pivotable lever being arranged such that, in use, it becomes operatively disconnected when the door has been swung to the second position.

28. An assembly as claimed in claim 27 in which the link mechanism and said at least one rod are contained within the door and in which the pivotable lever becomes operatively disconnected by disengagement with an associated pivot pin and in which the lever is provided at one end thereof with a curved edge which engages said pivot pin and remains in engagement therewith while the lever is pivoted in a first direction of rotation to swing said door from the first position to the second position but then becomes operatively disconnected therefrom on further rotation of the lever in the first direction whilst still being connected to the link mechanism by way of a link.

29. A lever mechanism comprising a support plate or support member having a recess housing a hand-operable pivotable lever, the lever being connected to one end of a link by a first pivot pin and the other end of the link being connected to a second pivot pin which passes through a slot in a wall of the recess, said second pin being constrained to move along the slot upon rotation of the pivotable lever about an axis provided by a third pivot pin, a connecting member being mounted between the first pin and third pivot pin, the arrangement being such that the lever may be rotated in a first direction from a first position within the recess about said axis until said second pin reaches the bottom of said slot, during which rotation the connecting member rotates about said axis, whereupon further rotation of the handle in said first direction results in the handle being operatively disconnected from the remainder of the lever mechanism by the lever being disconnected from said axis.

30. A sliding door assembly of the type specified in which the at least one swingable door is hung from a slide rail and carries slider means, for example rollers, which slider means is adjacent to an upper portion of said at least one swingable door and co-operable with said slide rail to allow said door to be slid along the slide rail in use, said slider means being arranged to pivot about the slide rail relative to said door when said door is swung from the first position relative to the second position, the slide rail defining a groove along which the slider means is entrained to move, said groove being appropriately dimensioned to allow the slider means to pivot whilst still in the groove and in which the width of the bottom of the groove conforms to the width of the slider means.

* * * * *